United States Patent [19]

Browne et al.

[11] Patent Number: 4,523,474
[45] Date of Patent: Jun. 18, 1985

[54] CAPACITIVE PRESSURE SENSOR

[75] Inventors: Vance d'A. Browne, Arlington Heights; George E. Kochanek, Glen Ellyn, both of Ill.

[73] Assignee: Borg-Warner Corporation, Chicago, Ill.

[21] Appl. No.: 522,776

[22] Filed: Aug. 12, 1983

[51] Int. Cl.³ .......................... G01L 7/08; G01L 9/12; H01G 7/00
[52] U.S. Cl. .......................... 73/724; 73/718; 361/283
[58] Field of Search .................. 73/724, 718; 361/283; 92/103 SD

[56] References Cited

U.S. PATENT DOCUMENTS

| 3,479,879 | 11/1969 | Music | 361/283 |
|---|---|---|---|
| 3,634,727 | 1/1972 | Polye | 317/231 |
| 3,808,480 | 4/1974 | Johnston | 317/256 |
| 3,858,097 | 12/1974 | Polye | 317/248 |
| 3,859,575 | 1/1975 | Lee et al. | 317/246 |
| 3,952,234 | 4/1976 | Birchall | 317/246 |
| 4,064,550 | 12/1977 | Dias et al. | 361/283 |
| 4,089,036 | 5/1978 | Geronime | 361/283 |
| 4,125,027 | 11/1978 | Clark | 73/724 |
| 4,295,376 | 10/1981 | Bell | 73/724 |
| 4,434,451 | 2/1984 | Delatorrie | 73/718 |

Primary Examiner—Donald O. Woodiel
Attorney, Agent, or Firm—Florian S. Gregorczyk

[57] ABSTRACT

A capacitive sensor for use in the measurement of pressure or pressure changes of a fluid medium which sensor maintains the capacitor electrodes in a substantially parallel relationship. Maintenance of this parallel relationship provides a substantially linear capacitive output over a given range without further electronic buffering or calibration. The capacitive signal may be enhanced or amplified by use of multiple parallel plates which are movable simultaneously with deflection of the flexible diaphragm.

2 Claims, 4 Drawing Figures

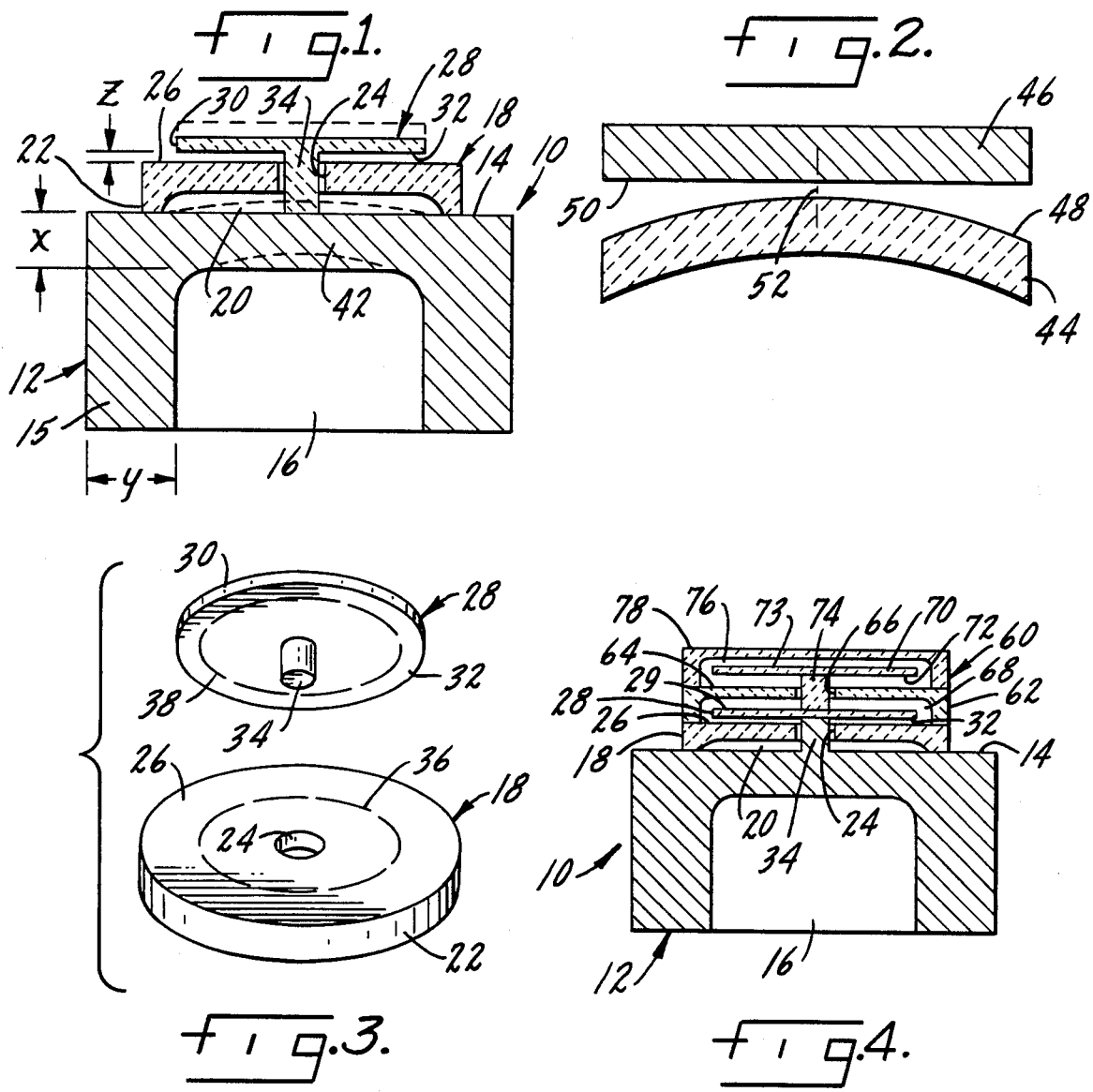

CAPACITIVE PRESSURE SENSOR

BACKGROUND OF THE INVENTION

1. Field of the Invention

A capacitive pressure sensor for use in the measurement of pressure in a fluid medium, which medium may be either liquid or gas.

2. Prior Art

Capacitive pressure sensors as known in the prior art generally teach a pressure responsive diaphragm forming one plate or electrode of a capacitor. This electrode or capacitive plate is subject to deformation, generally spherical, and is mated or compared to a second electrode means of a stable or unmoving capacitive plate. As the spherical deformation expands or contracts the distance between the diaphragm capacitor plate and the second capacitor plate produces an electrical or an electrically translatable signal which varies with the radial distance from the center of the first electrode. This spherically variable distance between electrodes requires adjustments and calibrations to accurately define the signal produced or for utilization of the signal as a measure of the deforming force. Further, such material on which the diaphragm capacitor electrode means is mounted requires a merger of physical properties, specifically the merger of electrical and elastic modulous as well as a degree of bonding between two dissimilar materials. The production of capacitor sensors or transducers is well-known as is shown in the following patents.

There are certain inherent problems in the capacitive structures taught in today's technology: (1) calibration; (2) outside noise; (3) output as a function of small diaphragm deflections; (4) close tolerance of manufacture; and, (5) relatively high costs of materials. Indicative of both the complexity and steps taken to overcome these problems is the capacitance-type pressure transducer taught in U.S. Pat. No. 3,634,727 (Polye) wherein the sensor has a hollow capsule formed by a pair of discs of single crystal silicon-doped material to make it electrically conductive. A layer of silicon dioxide is deposited on the surfaces of the discs which are then selectively etched to form a cavity. The pair of discs are insulated from each other and cooperate to form the plates of a condenser with varying capacities responsive to pressure changes. This device is particularly useful in airborne applications. However, it highlights the materials complexity and those steps, including doping, thin film deposition and selective etching, to which others have gone to overcome the problem of sensing pressure by springs and diaphragms. The use of single crystal materials or single crystal silicon disclosed herein is an extreme example of an uneconomical material not readily available for general use. Also noted in this patent is the hysteresis characteristics which such sensors operate to overcome. U.S. Pat. No. 3,808,480 (Johnston) discloses a pressure transducer with a concave flexible pressure responsive diaphragm that is hermetically sealed and cooperates with a central electrode to define a variable capacitor. The flexible diaphragm and central electrode are encased and the space between the central electrode and flexible diaphragms is evacuated to provide a benign environment for the circuitry. Recognition of the problem of the flexing of the substrate and the stress therein during the operation of the device is noted. A composite laminar structure or substrate is provided to minimize the stray capacitance between the electrodes and the covers or housing. The operative structure is secured by screws which pass through substrate and provision is made to utilize such screws for external wiring terminals.

U.S. Pat. No. 3,858,097 (Polye) teaches a pressure sensing capacitor to change pressure outputs to electrical signals. A reference capacitor and pressure sensing capacitor may be connected in the arms of a bridge circuit, alternatively, one of the capacitors may be connected to the input of an amplifier and the other capacitor to a feedback path around the amplifier such that the signal is proportional to the ratio of these capacitors as a function of pressure. This particular invention is designed to overcome variations caused by temperature changes in the transducer. This transducer device includes a hollow body with opposing walls supported at the edges. The portions of the walls spaced from the edges, that is toward the center of the hollow, being deflectable relative to one another and responsive to pressure changes. The wall portions are substantially stable relative to one another and measure pressure change on the deflectable wall portions while maintaining the electrical conducting means on the nondeflectable portions. This device teaches a dual capacitor arrangement, one being a reference capacitor which is relatively stable and the second having a deflectable capacitor to measure the pressure change and compare such pressure change to the reference capacitor.

U.S. Pat. No. 3,859,575 (Lee et al.) teaches a variable capacitance sensor having capacitor plates connected at their center. The conducting plates or surfaces are insulated from a central connection and each other. The structure provides a stress relieving means which eliminates hysteresis effects. In this patent the pressure responsive diaphragm forms one plate of the capacitor, and the charge and separation between capacitor plates varies radially as in prior pressure sensor devices.

U.S. Pat. No. 3,952,234 teaches or discloses the very structural problem which the present invention serves to overcome, that is, an electrode formed on one surface of the diaphrgm of such a pressure sensor or transducer forming one of the electrical electrodes and producing an arched or spherical capacitance change requiring intergration of such varying signal across a radius. The deflection of such diaphragm and electrode is a problem recognized earlier in U.S. Pat. No. 3,859,575—Lee et al. patent which further produces hysteresis conditions that are found to be unfavorable.

U.S. Pat. No. 4,064,550 to Dias et al. teaches a capacitive fluid pressure transducer with electrodes on quartz bodies and diaphragms in a structure shown to produce the spherical condition noted in their FIGS. 5A and 5B. However, this patent clearly indicates one of the basic criteria of producing a capacitive transducer, that is, ". . . transducer is generally difficult to produce, it is very rugged and reliable . . . ". The desirability of a parallel plate capacitor is clearly noted in this patent at column 4, line 25 and, further, it is noted that these individuals were unable to develop the concept to produce such an item, but again had to utilize a calibration or adjustment based on a predictable function of the pressure as a function of the elastic properties of the material of the diaphragm, its diameter and thickness, and the quality of the diaphragm clamp. This latter recognition of the problems associated with past transducer assemblies is therefore again recognized in the art. U.S. Pat. No. 4,089,036 (Geronime) teaches a capacitive-type load cell with a support and diaphragm member mounted thereto. The diaphragm member again has a conductive surface and capacitor plate attached thereto, so that upon deflection of the diaphragm there will be relative movement between the diaphragm and the capacitor plate. This distance between plates or plate and conductive surface is the means of producing a measured signal calibratible to a pressure associated therewith. The diaphragm of the present device of Geronime provides free edge bending at the outer edges and between the diaphragm and load support to provide reduced bending stresses in such diaphragm. Although Geronime '036 has reduced such bending stresses the deflection again causes differences in plate separation with changes in radius from the diaphragm center. This patent does recognize the usefulness of having such diaphragms made of metal, however, and the disclosure provides such surface forming a conductive surface of such diaphragm. The device taught in Geronime U.S. Pat. No. 4,089,036 recognizes its limitations and acknowledges the existence of the change in total capacitive measurement for a given load as unequal bending occurs in the diaphragm and is felt to be averaged-out by the capacitor plate. Such load cells are frequently used for the measurement of large changes in large mass-type operations, such as, basic oxygen furnace measurements, measurements dealing with seismic changes, and require a larger or seismic mass to operate. Although such limitations are not noted in the Geronime U.S. Pat. No. 4,089,036, U.S. Pat. No. 4,125,027 (Clark) teaches a gage for remote indication of pressure in a subterranean formation. This apparatus measures such changes in pressure utilizing a variable capacitor or capacitance arrangement. The apparatus has a tubular housing with a deformable end forming a diaphragm which deflects inwardly, the deflection of such diaphragm causes a separation between the diaphragm and a capacitance or conductive plate which provides a change in a capacitive load or measurement, thereby providing the signal for the pressure measurement. However, this device teaches that such deformation is or will be concave inwardly and the capacitive relationship between the conductive surface and the deformable end changes to provide an indication of ambient pressure. Such changes based on this concavity are again subject to variation along the radius from a central point and this disclosure acknowledges such changes and provides for a circuitry to compensate for such variation. They refer to such circuitry as a buffer and acknowledges that such buffering improves the signal and provides a measurable quantity.

U.S. Pat. No. 4,295,376 (Bell) teaches a capacitive pressure transducer to provide a substantially linear relationship between transducer output and input variations. Again, a force is applied to a diaphragm whose opposite surface includes a pair of electrodes at different positions. The force provides a variation or differential deflection of such diaphragm mounted electrodes. The deflection of the capacitive or capacitor plates is again provided in an arcuate or spherical shape as shown in FIG. 6 of this patent. Electronics are again utilized to buffer or correct the signal provided. A plate is provided in this device to move with the diaphragm and to maintain a fixed spacing of these spacer elements which vary in opposite senses. Therefore, the diaphragm having some of the electrodes flexes, while the relatively rigid plate stands firm. The capacitance variations at a radial distance are still inherent in such device.

The objective of all of the above devices is to provide a capacitance or capacitor-type signal to measure force or, more generally, pressure. This measurement is proportional to or a function of a change in distance between capacitor plates. The problems alluded to above include materials, construction, separation, hysteresis, cost, environment, temperature, and the flexure or variation in the diaphragm generally utilized in such structures. This flexure provides bending and torsional forces or stresses, and this condition has been accommodated in both the Bell U.S. Pat. No. 4,295,376 and Lee et al, disclosures above. Further, the attainment of a substantially constant parallel separation between the plates of the capacitors or capacitor of such transducer devices has been alluded to in both the Bell U.S. Pat. No. 4,295,376 and the Dias et al., U.S. Pat. No. 4,064,550. There is one last condition which is provided by the use of materials which are more responsive or which can accommodate larger deflections. Larger diaphragm deflections provide a greater range over which to calibrate a device and such broader range can lead to more accurate or a more easily measured signal over a narrower range of pressure differentials.

BRIEF DESCRIPTION OF THE DRAWINGS

In the figures of the drawing like reference numerals identify like components and in the drawings:

FIG. 1 is a diagrammatic cross-section of the present invention;

FIG. 2 illustrates the radial change in plate separation distance of a spherically flexed plate;

FIG. 3 illustrates an exploded view of the relationship between the fixed and movable plates; and, FIG. 4 illustrates an alternative embodiment of the present invention utilizing a multiple plate sensor.

SUMMARY OF THE INVENTION

The invention encompasses a capacitive sensor for use in the measurement of pressure in a fluid medium to allow the electrodes of such capacitor to remain in a substantially parallel relationship as the separation distance between the electrodes changes. This sensor includes a flexible diaphragm, a fixed plate mounted on the diaphragm and a movable plate operable by and connected to the flexible diaphragm through a port defined by the fixed plate. The flexible diaphragm provides a pressure monitoring cavity and a wall. When pressure is applied to such cavity the wall flexes to move the movable plate and change the separation distance between an electrode mounted on the movable plate and its counterpart electrode mounted on the fixed plate. The change in separation between such capacitor electrodes provides a measurable signal which may be calibrated to or bears a relationship with changes in pressure within the pressure chamber of the diaphragm member. Such electronic signals may be connected to an external electronic sensing means or calibration source. Maintaining the plates in a substantially parallel relationship provides a means to produce a larger and substantially linear signal at least over part of the capacitance range, to minimize or substantially reduce the effects of hysteresis and further to provide ease of assembly and broaden or enhance the selection of materials for such sensor applications.

DETAILED DESCRIPTION OF THE INVENTION

The relationship of the parts of the assembly of a capacitive sensor 10 for use in the measurement of pressure in a fluid medium is illustrated in FIG. 1. In FIG. 1 sensor 10 includes a flexible diaphragm 12 defining a reference surface 14, a pressure chamber 16, a side wall 15 and an upper wall 42. Mounted on surface 14 is a first fixed plate 18 which cooperates with reference surface 14 to define a cavity 20 therebetween. Fixed plate 18 has outer leg portions 22 illustrated as an annular ring. Fixed plate 18 may also be a relatively thin annular ring and top plate assembly. Leg portions or thin annular ring 22 is geometrically proportioned to transmit a minimal bending moment to fixed plate 18 such that plate 18 remains substantially flat. Fixed plate 18 defines an outer surface 26 and a port 24 shown as centrally located in plate 18, wherein port 24 communicates between cavity 20 and outer surface 26. A movable plate 28 with a wall 30 has a lower surface 32. Movable plate 28, as shown in FIG. 1 includes a rod member 34 extending through port 24 to contact reference surface 14. As reference surface 14 flexes, as a function of a change in pressure in chamber 16, rod member 34 moves movable plate 28.

FIG. 3 illustrates in an exploded view the relationship between fixed plate 18 and movable plate means 28. Positioned on fixed plate outer surface 26 in FIGS. 1 and 3 is a first electrode means 36, and mounted as a mirror image of first electrode means 36 on lower surface 32 of movable plate means 28 is a second electrode means 38 of a capacitive member 40. As movable plate 28 with electrode means 38 moves in relation to fixed plate 18 with electrode means 36 a change in the capacitance measured between electrode means 36 and 38 is noted. Such capacitance change may be noted and communicated to an external electronic means (not shown) for use in the measurement of pressure changes in pressure chamber 16. The vertical relationship or distance 'z' in FIG. 1 between electrodes 36 and 38 varies with the movement of plate 28 but does not vary as a function of the horizontal or radial distance away from port 24 or extension 34. Thus, a linear relationship may be noted at least over a portion of the capacitance range as movable plate 28 moves in relation to fixed plate 18.

In an alternative embodiment shown in FIG. 4 the transducer assembly or capacitive sensor 10 includes a second parallel plate arrangement 60 mounted atop first fixed plate 18. Parallel plate arrangement 60 includes a second fixed plate 62 defining a top surface 64 and a rod port 66 coaxial with port 24 of fixed plate 18. Second fixed plate 62 cooperates with outer surface 26 of fixed plate 18 to define a second cavity 68, wherein movable plate 28 is operable by rod member 34. In this figure rod member 34 is shown as extending from diaphragm reference surface 14 to contact movable plate 28 clearly showing that such rod member may extend from either element 14 or 28 to contact the other. In this second parallel plate arrangement 60 a second movable plate 70 includes a bottom surface 72 which is parallel to top surface 64. A second rod member 74, coaxial with rod member 34, extends through port 66 and is connected to first movable plate 28 and second movable plate 70. A final fixed plate member 78 is positioned atop second fixed plate 62 to define a cavity 76 therebetween in which second movable plate 70 is operable. Bottom or lowe surface 72 is parallel to top surface 64, which surfaces 72, 64 have electrodes mounted thereon similar to the electrodes 36, 38 of first movable plate 28 and outer surface 26.

This structure provides a means to effectively increase, in this case double, the amplitude of the diaphragm deflection. This increased amplitude provides a larger signal for an equivalent deflection or an equivalent capacitance signal for a smaller signal. The ganging or stacking of such plates does not alter the function of the preferred embodiment. The rod members as noted earlier may be integral to a movable plate, the flexible diaphragm or a separate element connected between the movable plate and diaphragm. In addition, a fixed plate such as plate 78 may be provided for the structure in FIG. 1 to provide a sealed cavity for movable plate 28. Further, the structure of FIG. 4 may have electrode means as in FIG. 3 positioned on the upper surfaces 29, 73 and lower surfaces 32, 72 defined by movable plates 28 and 70 as well as electrodes on the facing surfaces of fixed plates 18, 60 and 62. These added electrode means would further enhance the change in capacitance signal and provide a larger amplification to the signal to broaden the capacitance output range over which the output would be linear.

As noted by dashed lines in FIG. 1, the deflection of diaphragm 12 will produce an arc. This arcing condition is a function of the structure of diaphragm 12 wherein the walls 15 defined by diaphragm 12 have a thickness 'Y' larger than the upper wall 42 thickness noted as 'X'. Such differential in wall thickness provides the location for deformation as known in the art.

An example of the prior art variation in vertical distance as a function of the horizontal distance from the center or generally central position is shown in FIG. 2. A diaphragm or moving plate 44 is arced and its relation to a fixed plate 46 illustrates the variation in plate separation that must be overcome. Flexible plate or diaphragm 44 defines a center location 52 and an upper surface 48 and fixed plate 46 defines a lower surface 50. Surfaces 48 and 50 have electrode means mounted thereon similar to those noted in FIG. 3. When such electrode means is mounted on flexible diaphragm 44, the capacitance relationship as a function of distance from fixed plate surface 50 will vary as the distance from fixed plates 46. Therefore, in the structure of FIG. 2 the vertical distance between surfaces 48 and 50 varies as a function of the radius from the center 52 of diaphragm 44. This variation in vertical distance between electrodes causes a variation in capacitance as a function of the radius from center 52 and must be compensated for in any sensor.

The material of flexible diaphragm 12 may be a metal, an electrically conductive material, with low elastic or relatively low elastic modulus and high strength. Such low modulus will provide a larger deflection at a given stress than those deflections to be expected from a ceramic material. Further, such metal structures are less expensive, more fatigue resistant and generally provide better resistance to brittle fracture than do ceramic-type diaphragms. These physical characteristics provide a means to acquire larger deflections at the same pressure level than do ceramic products, while such metal structures are more tolerant of stress and fatigue.

As the pressure chamber 16 is defined by diaphragm 12 and is provided in a sealed environment the relationship between the fixed plate and moving plate are not dependent upon a sealed environment per se. Further, the materials of movable plate means 28 and fixed plate 18 may be of any material adequate for purpose of capacitor-type operations. Such items include a ceramic, a dielectric or any insulating-type material. The capacitors only require that the output from such device, that is, the capacitance, is measurable as a function of distance. In fact, such capacitor devices, may be adequately insulated metals with electrodes mounted thereon. The choice of materials is only limited by the designer and the economics of the application. Further, the size of cavity 20 is not critical but requires only that diaphragm 12 be able to flex. Movable plate means 28 and fixed plate 18 readily lend themselves to ease of manufacture as outer surface 26 and lower surface 32 are substantially parallel and remain in that relationship.

Although the vertical separation varies, lower surface 32 and outer surface 26 remain relatively parallel throughout their separation. Therefore, the sensitivity of this arrangement is significantly improved over that of devices utilizing the structure shown in FIG. 2.

The transducer or pressure sensor means 10 readily lends itself to ease of manufacture as the only requirement of a "critical" dimension is the separation distance between the plate members. However, any variation in the separation distance may be accounted for during post-assembly calibration by means of electronic equipment not shown. Thus, this critical dimension is easily compensated for after, not during, manufacture.

Those skilled in the art will recognize that certain variations can be made in the illustrative embodiment. While only specific embodiments of the invention have been described and shown, it is apparent that various alterations and modifications can be made therein. It is, therefore, the intention in the appended claims to cover all such modifications and alterations as may fall within the true scope of the invention.

I claim:

1. A capacitive sensor for use in the measurement of pressure in a fluid medium, comprising:
   a flexible diaphragm defining a reference surface, side walls and a pressure chamber, which reference surface is deflectable in response to a force acting in said pressure chamber;
   a first fixed plate having outer leg portions or an annular ring and defining a port and an outer surface, which outer leg portions are mounted on said flexible diaphragm side walls at said reference surface, said first fixed plate and said diaphragm reference surface cooperating to define a cavity to accommodate any deformation of the diaphragm reference surface;
   a first movable plate having a wall with a lower surface substantially parallel to said fixed plate outer surface;
   a final fixed plate defining an annular ring to contact said first fixed plate outer leg portion or annular ring, which first fixed plate and said final fixed plate cooperate to define a sealed cavity therebetween, wherein said first movable plate is positioned and operable;
   a rod member dimensioned to extend through said first fixed plate port to contact both said flexible diaphragm reference surface and said first movable plate, to displace said first movable plate in said sealed cavity as the diaphragm reference surface is displaced;
   and a capacitive member including first and second electrodes, with the first electrode affixed to the first fixed plate outer surface and the second electrode affixed to the first movable plate lower surface, thus changing the capacitance of the capacitive member as the diaphragm reference surface and thus the first movable plate is deflected.

2. A capacitive sensor for use in the measurement of pressure in a fluid medium, comprising:
   a flexible diaphragm defining a reference surface, side walls and a pressure chamber, which reference surface is deflectable in response to a force acting in said pressure chamber;
   a first fixed plate having outer leg portions or an annular ring and defining a port and an outer surface which outer leg portions are mounted on said side walls at said reference surface;
   said first fixed plate and said diaphragm reference surface cooperating to define a cavity to accommodate any deformation of the diaphragm reference surface;
   a second fixed plate having second plate outer leg portions or second plate annular ring to contact said first fixed plate outer leg portions or annular ring, which first fixed plate and second fixed plate cooperate to define a second cavity, and further said second fixed plate defining a rod port and a top surface;
   a final fixed plate having an annular ring to contact said second fixed plate outer leg portion or annular ring which final fixed plate and said second fixed plate cooperate to define a sealed cavity therebetween;
   a first movable plate positioned and operable in said second cavity and having a wall with a lower surface substantially parallel with said first fixed plate outer surface;
   a second movable plate positioned and operable in said sealed cavity and having a wall with a bottom surface substantially parallel with said second plate top surface;
   a rod member extending through said first fixed plate port to contact both said first movable plate and said flexible diaphragm reference surface and operable to displace said first movable plate as the diaphragm reference surface is displaced;
   a second rod member extending through said second fixed plate rod port to contact both said first movable plate and said second movable plate and operable to displace said second movable plate as said first movable plate is displaced;
   a capacitive member with electrode means including a first electrode affixed to both said first fixed plate outer surface and a similar first electrode positioned on said second fixed plate top surface, and a second electrode affixed to said first movable plate lower surface and a similar second electrode affixed to said second movable plate bottom surface, which first and second electrode pairs respectively, cooperate to effect a change in capacitance of the capacitive member as the diaphragm reference surface deflects to move said first and second movable plates.

* * * * *